(12) United States Patent
Owada (10) Patent No.: US 6,442,133 B2
(45) Date of Patent: Aug. 27, 2002

(54) SWITCHBOARD HAVING A DUAL SWITCHING SYSTEM

(75) Inventor: Junichi Owada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/862,464

(22) Filed: May 23, 2001

(30) Foreign Application Priority Data

May 24, 2000 (JP) ........................................ 2000-152298

(51) Int. Cl.[7] .............................................. H04L 12/56
(52) U.S. Cl. ........................................ 370/219; 370/220
(58) Field of Search ................................ 370/219, 220, 370/221, 225, 244, 216, 218; 709/239; 714/2

(56) References Cited

U.S. PATENT DOCUMENTS

| | | | | |
|---|---|---|---|---|
| 4,961,180 A | * | 10/1990 | Schwarz et al. | |
| 5,274,633 A | * | 12/1993 | Kato et al. | |
| 5,390,163 A | | 2/1995 | Itoh et al. | ...................... 370/13 |
| 5,471,460 A | * | 11/1995 | Tanabe | |
| 5,936,938 A | * | 8/1999 | Weldon et al. | ............... 370/228 |
| 6,111,852 A | * | 8/2000 | Leung et al. | ................ 370/217 |
| 6,252,846 B1 | * | 6/2001 | Fujita | ......................... 370/220 |
| 6,269,077 B1 | * | 7/2001 | Matsumura et al. | ......... 370/218 |

FOREIGN PATENT DOCUMENTS

| | | |
|---|---|---|
| JP | 6-303255 | 10/1994 |
| JP | 7-264210 | 10/1995 |
| JP | 11-261590 | 9/1999 |

* cited by examiner

*Primary Examiner*—Douglas Olms
*Assistant Examiner*—Ken Vanderpuye
(74) *Attorney, Agent, or Firm*—Foley & Lardner (57) ABSTRACT

A switchboard system includes an input/output section, first and second switches each for acting an active side switch or a standby side switch, a signal processing section for processing received cells, and a control section. The control section switches active side ascending cell routes from the then active side switch to the then standby side switch, transmits a plurality of specified cells through the active side switch to te signal processing section, and receives the specified cells through the active side switch, and switches active side descending cell routes from the then active side switch to the then standby side switch.

11 Claims, 10 Drawing Sheets

SWITCHBOARD HAVING A DUAL SWITCHING SYSTEM

BACKGROUND OF THE INVENTION

1. Field of the Invention

The present invention relates to a switchboard having a dual switching system for use in an ATM (Asynchronous Transfer Mode) switchboard. The present invention also relates to a method for controlling such a switchboard.

2. Description of the Prior Art

In a circuit switching system including dual ATM switches as used in an ATM switchboard, a buffer is generally provided for a 156-Mbp line or a 622-Mbp line in order to prevent a cell loss at the time of circuit switching between the dual ATM switches. The buffer generally stores ATM cells at the line terminal to prevent the ATM cells from flowing into a then-active side (ACT side) ATM switch during the switching. In a small scale ATM switchboard wherein the circuit switching system should be more compact, the ATM switchboard can hardly be provided with a large number of buffers. As a result, a problem of cell loss is encountered at the time of the circuit switching.

Figure 1:
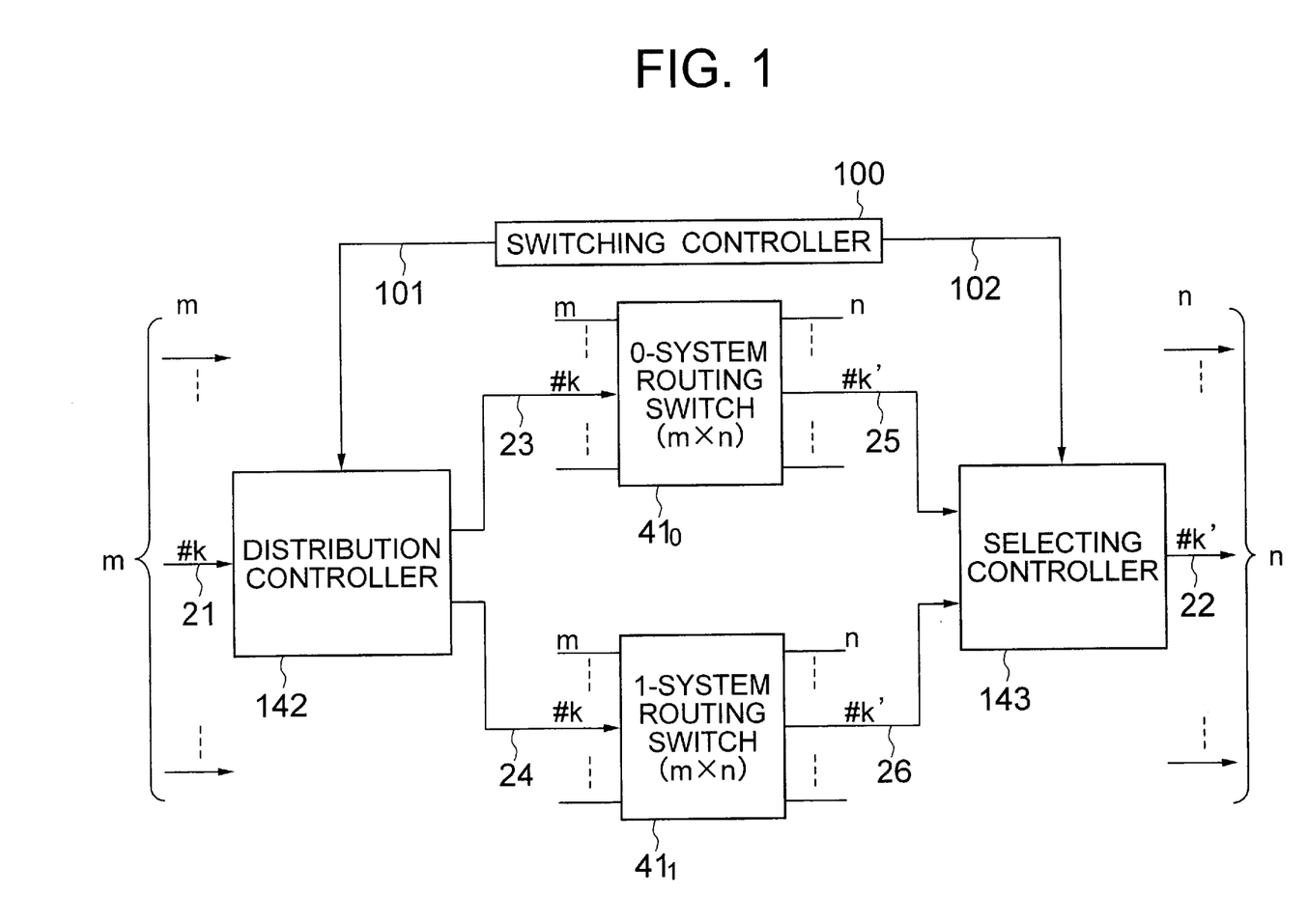
FIG. 1 is a block diagram showing a conventional circuit switching system in an ATM switchboard.

Japanese Patent Laid-Open Publication No. Hei. 7-264210 (first publication) describes a circuit switching system, which need not have a large number of buffers for the circuit switching system. FIG. 1 is a block diagram of the configuration of the conventional ATM switchboard described in the first publication. The ATM switchboard includes a distribution controller 142, a 0-system routing switch $41_0$, a 1-system routing switch $41_1$, a selecting controller 143, and a switching controller 100. A number of (m) input lines are connected to the distribution controller 142, and a number of (m) 0-system (ACT: active) lines and the same number of (m) 1-system (SBY: stand-by) lines are connected to the outputs of the distribution controller 142. All the 0-system lines on the output side of the distribution controller 142 are connected to the 0-system routing switch 41-0 and all the 1-system lines on the output side of the distribution controller 142 are connected to the 1-system routing switch 41-1. A number of (n) 0-system lines on the output side of the 0-system routing switch 41-0 and a number of (n) lines on the output side of the 1-system routing switch 41-1 are connected to the input of the selecting controller 143, the number of outputs of which is n. The ATM switchboard connects m input lines of the distribution controller 142 to the n output lines of the selecting controller 143, given m and n are integers, for transferring ATM cells from any of the m input lines 21 to any of the n output lines 22.

In the description to follow for the operation of the ATM switchboard of FIG. 1, it is assumed that the 0-system lines are used in the initial stage between the distribution controller 142 and the selecting controller 143. More specifically, the distribution controller 142 and the 0-system routing switch 41-0 are connected together, and the 0-system routing switch 41-0 and the selecting controller 143 are connected together.

The connection from the distribution controller 142 to the 0-system routing switch 41-0 is now to be switched to the 1-system routing switch 41-1. First, nXm specified cells used for the purpose of the switching are sent corresponding to the number (n) of the output lines to the m input lines of the 0-system routing switch 41-0. The switching controller 100 switches the output side between the routing ro switches after all the (m×n) specified cells supplied through the m input lines appear on the output side of the 0-system routing switch 41-0. More specifically, the connection from the 0-system routing switch 41-0 to the selecting controller 143 is switched to the connection from the 1-system routing switch 41-1 to the selecting controller 143.

Thus, cell loss or line cutoff can be prevented by switching the cell routing switch at the time of switching between the 1-system and the 0-system.

Other techniques for the circuit switching system are described Japanese Patent Laid-Open Publications No. Hei, 6-303255 (second publication) and No. Hei. 11-261590 (third publication).

In the description of the first publication, the switching operation takes place only when all the specified cells provided to the m input lines of the distribution controller 142 appear on the output side of the 0-system routing switch 41-0. Therefore, if part of the specified cells is lost for some reason during the cell transmission, the switching operation does not take place. This disadvantage is not solved either by the circuit switching systems or the ATM switch boards described in the second and third publications.

SUMMARY OF THE INVENTION

It is therefore an object of the present invention to provide a circuit switching system for use in an ATM switchboard, which can prevent a cell loss without having to provide a buffer at the line to terminal near the distribution controller, regardless of whether or not part of the specified cells is lost.

The present invention provides a switchboard system including: an input/output section for receiving/transmitting cells, the input/output section having a plurality of (m) external input terminals connected to m external input lines, m external output terminals connected to m external output lines, m internal input terminals and m internal output terminals; first and second switches each for acting an active side switch or a standby side switch, each of the first and second switches having m first ascending terminals, a plurality of (n) first descending terminals, n second ascending terminals, and m second descending terminals, the m first ascending terminals being connected to the m internal output terminals through m first ascending lines, the m second descending terminals being connected to the m internal input terminals, the m first ascending terminals being coupled to n first descending terminals by switching, the n second ascending terminals being coupled to the m second descending terminals by switching; a signal processing section for processing received cells, the signal processing section having n signal input terminals connected to the n first descending terminals of each of the first and second switches through n second descending lines, and n signal output terminals connected to the n second ascending terminals of each of the first and second switches through n second ascending lines; and a control section for controlling switching between the first switch and the second switch, the control section consecutively controls during the switching so that the control section switches active side ascending cell routes from the first and second ascending lines of a then active side switch to the first and second ascending lines of the then standby side switch, that the input/output section transmits a plurality of specified cells through at least the first ascending lines and the second descending lines of the active side switch to the signal processing section, and receives the specified cells through at least the second ascending lines and the first descending lines of the active side switch, and that the control section switches active side descending cell routes from the first and second descending lines of the then active side switch to the first and second descending lines of the then standby side switch, each of given m and n being an integer.

The present invention also provides a method for controlling switching in a switchboard system having an input/output section for receiving/transmitting cells, first and second switches each for acting an active side switch or a standby side switch to transmit cells to/from the input/output section, a signal processing section for processing cells received from one of the first and second switches, the method including the consecutive steps of:

switching active side ascending cell routes from first and second ascending lines of a then active side switch to first and second ascending lines of the then standby side switch;

transmitting a plurality of specified cells through the active side switch to the signal processing section to receive the specified cells through the active side switch, and switching active side descending cell routes from first and second descending lines of the then active side switch to first and second descending lines of the then standby side switch.

In accordance with the switchboard and the method for controlling a switchboard of the present invention, the input/output section or the signal processing section need not have a buffer therein. Each of the first and second switches preferably has a buffer, which has a smaller circuit scale compared to the buffer which may otherwise be provided in the input/output section or the signal processing section.

The above and other objects, features and advantages of the present invention will be more apparent from the following description, referring to the accompanying drawings.

DETAILED DESCRIPTION OF THE PREFERRED EMBODIMENTS

Now the present invention will be more specifically described with reference to a circuit switching system in an ATM switchboard according to an embodiment thereof.

Figure 2:
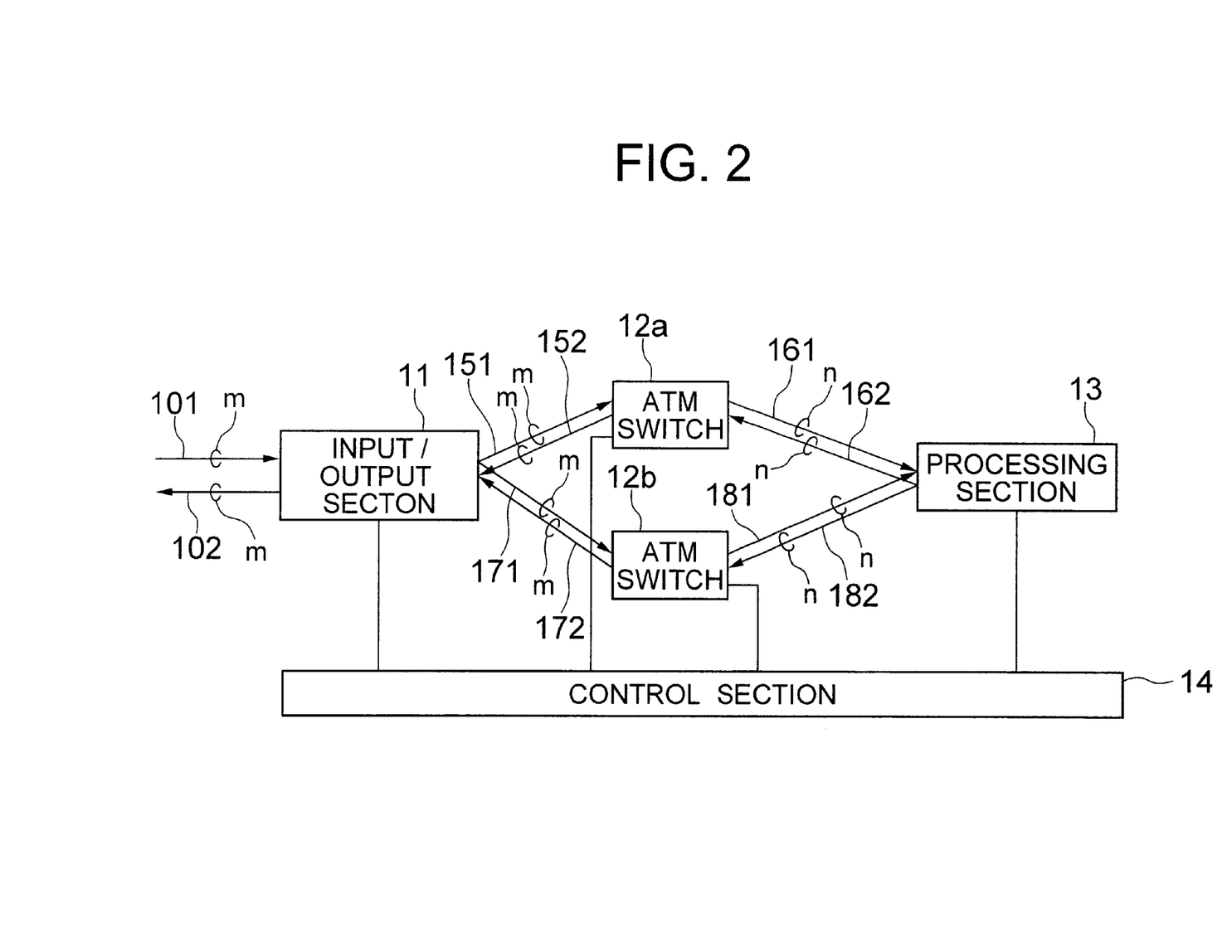
FIG. 2 is a block diagram of a circuit switching system for an ATM switchboard according to an embodiment of the present invention.

Referring to FIG. 2, the circuit switching system in the ATM switchboard includes an input/output section 11, an ATM switch 12a disposed on the ACT side, an ATM switch 12b disposed on the SBY side, an ATM application processing section 13, and a control section 14. The ACT side and the SBY side are switched by the control section 14.

A plurality of (m) input lines 101 and the same number of output lines 102 are connected to the external terminals of the input/output section 11, and m ACT side ascending signal lines 151 are connected from the input/output section 11 to the ACT side ATM switch 12a, whereas m SBY side ascending signal lines 171 are connected to the SBY side ATM switch 12b from the input/output section 11. In addition, m descending signal lines 152 are connected from the ATM switch 12a to the input/output section 11, whereas m descending signal lines 172 are connected from the ATM switch 12b to the input/output section 11.

A plurality of (n) descending signal lines 161 and 181 of each of the ACT side and SBY side ATM switches 12a and 12b are connected to the inputs of the ATM application processing section 13. In addition, n ascending signal lines 162 and 182 of each of the ACT side and SBY side ATM switches 12a and 12b are connected to the outputs of the signal processing section 13. The control section 14 controls the input/output section 11, the ACT side ATM switch 12a, the SEY side ATM switch 12b, and the ATM application processing section 13. The ATM application processing section 13 operates for signal processing of the ATM cells such as voice/sound processing or packet processing.

It is to be noted that although there is shown a single line for each of the signal paths in FIG. 2, the number of signal lines are such that the signal paths between input/output section 11 and each of the ATM switches include m ascending signal lines and m descending signal lines, and the signal paths between each of the ATM switches 12a and 12b and the ATM application processing section 13 include n ascending signal lines and n descending signal lines.

The function of the ATM switchboard shown in FIG. 2 is different from that of the ATM switchboard shown in FIG. 1. More specifically, in the circuit ATM switchboard according to the present embodiment, the ATM cells transmitted through the m input lines 101 to the input/output section 11 are subjected to signal processing by the ATM application processing section 13, and are delivered through the input/output section 11 and the m output lines 102 after the signal processing. The internal route of the ATM switchboard is switched between the ATM switches 12a and 12b by the function of the circuit switching system.

Figure 8:
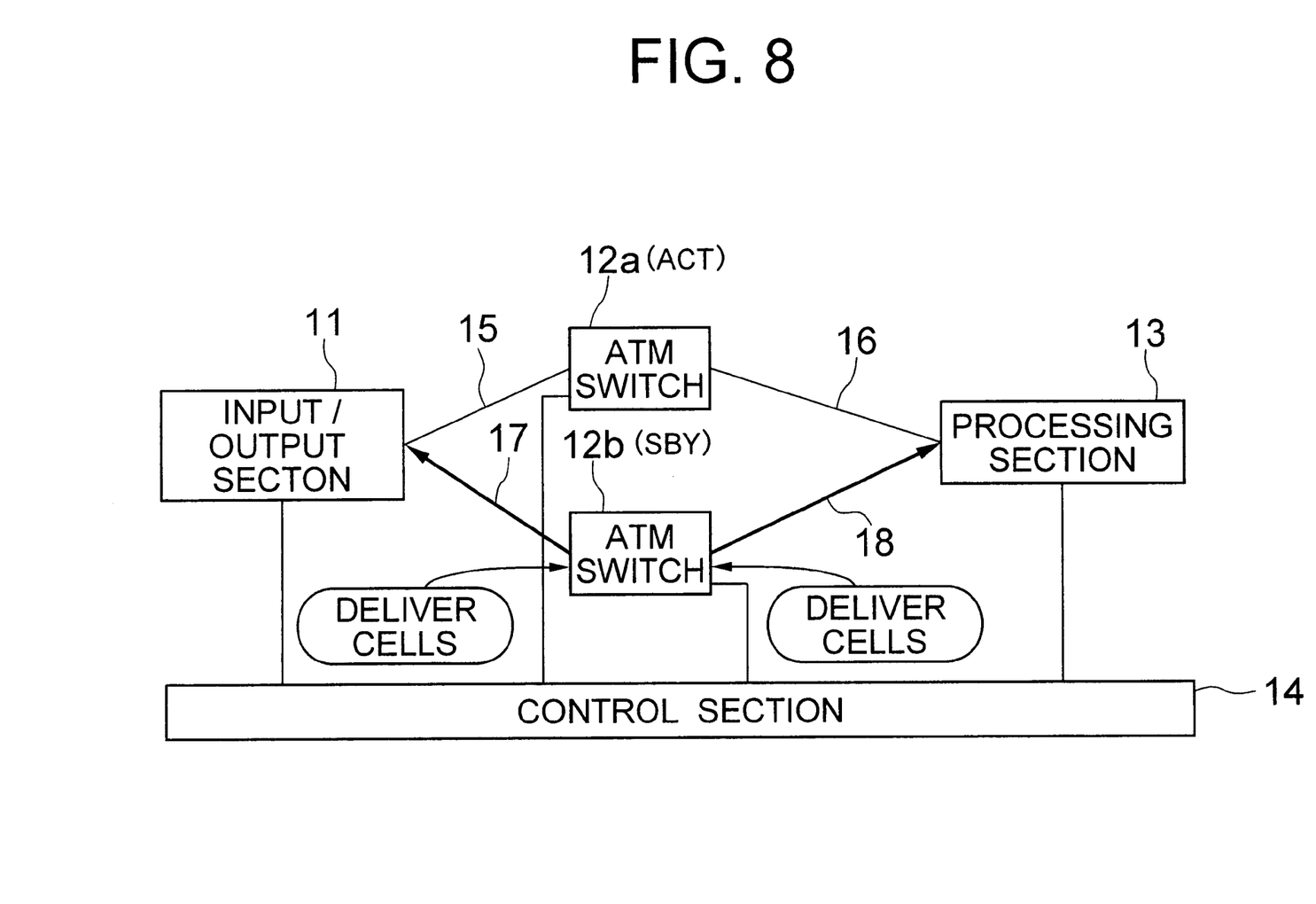
FIG. 8 is a block diagram of the circuit switching system, showing the flow of cells during a stage of the switching operation thereof.
Figure 9:
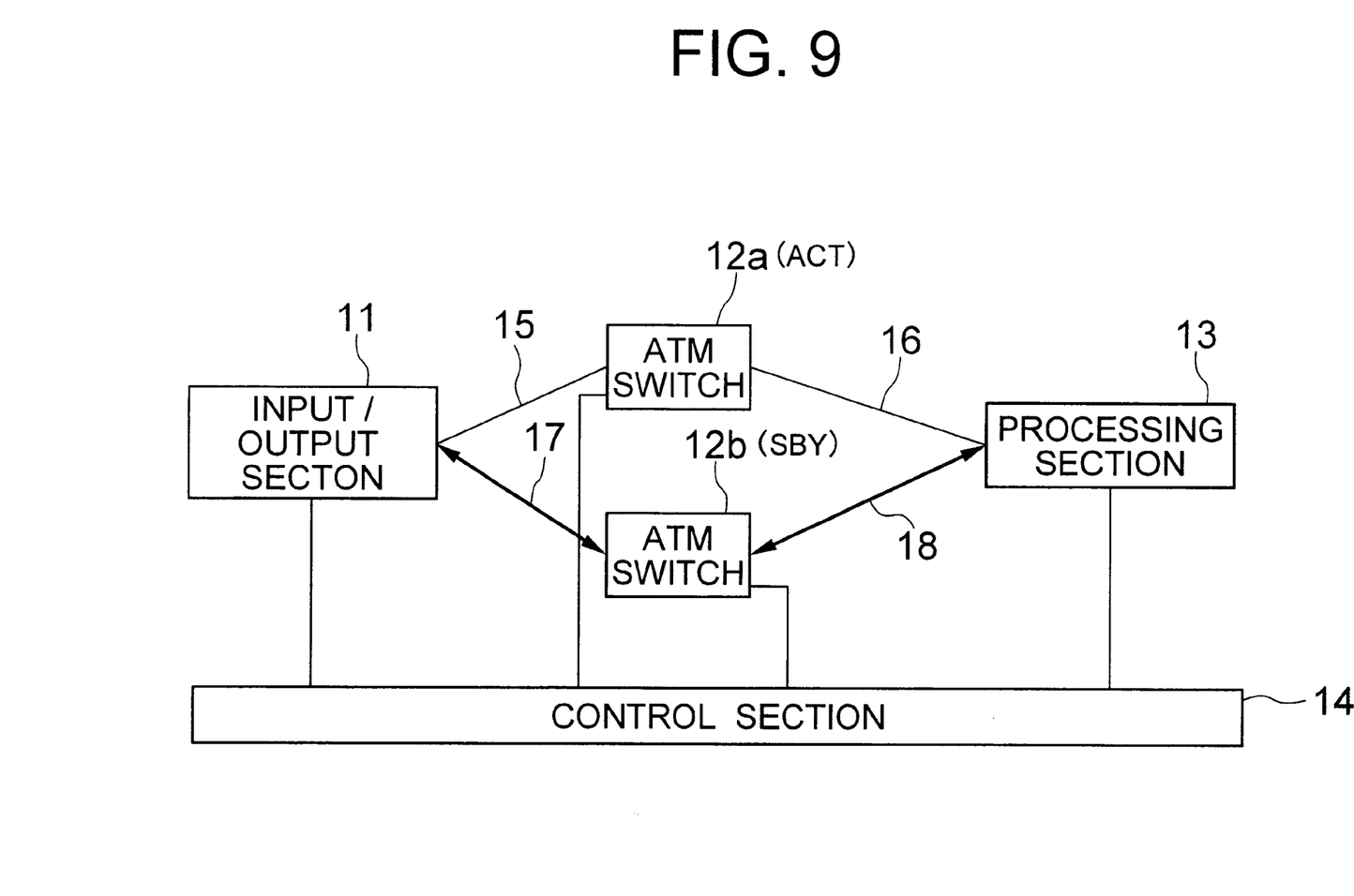
FIG. 9 is a block diagram of the circuit switching system, showing the flow of cells during a stage of the switching operation thereof.
Figure 10:
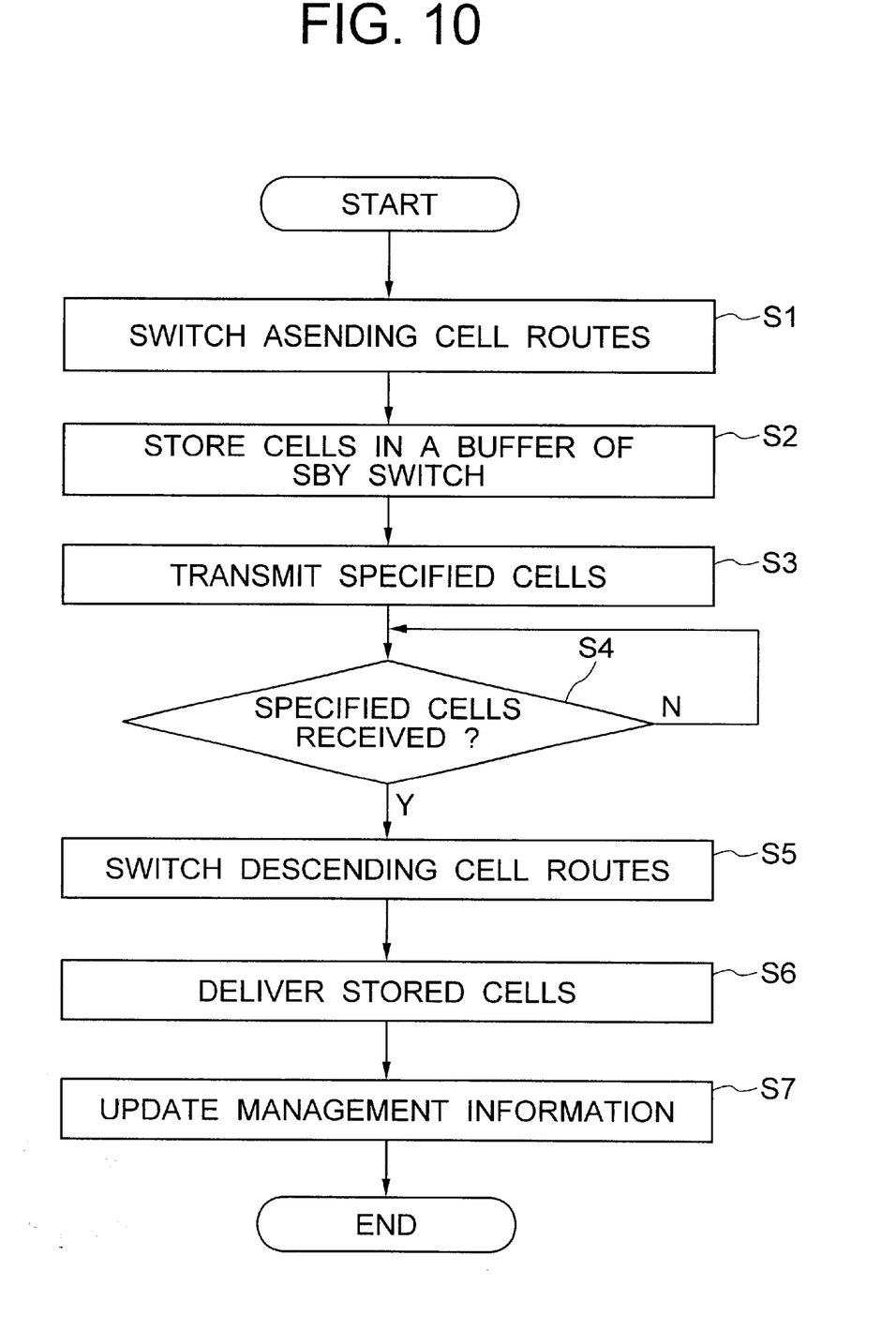
FIG. 10 is a block diagram of the circuit switching system, showing the flow of cells during a stage of the switching operation thereof.

The operation of the present embodiment will be described with reference to FIGS. 3 to 9 each representing the flow of cells at respective stages and to FIG. 10 illustrating the flowchart of the present embodiment. In this text, it is defined that the direction of the cell flow in which ATM cells are transmitted from the input/output section 11 or the ATM application processing section 13 to the ACT side ATM switch 12a is called "ascending" direction, and that the direction of the cell flow in which ATM cells are transmitted from the Act side ATM switch section 12a to the input/output section 11 or the ATM application section 13 is called "descending" direction. This also applies to the SBY side ATM switch 12b.

Figure 3:
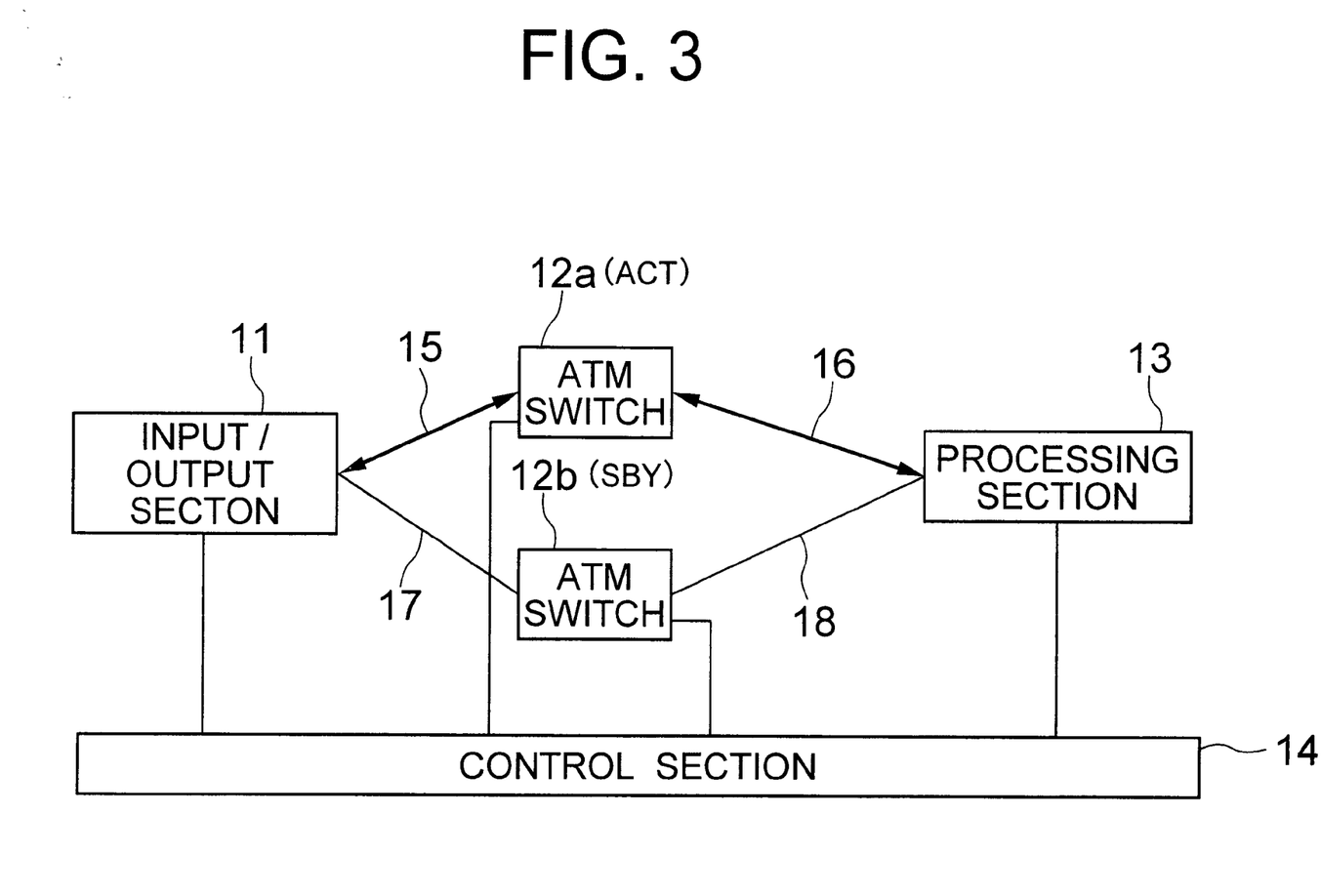
FIG. 3 is a block diagram of the circuit switching system, showing the flow of cells during a stage of the switching operation thereof.

FIG. 3 shows the initial stage of the cell flow, wherein the ATM cells are transmitted through the ACT side signal lines 15 (151 and 152) and 16 (161 and 162) and the ACT side ATM switch 12a. In this stage, the ATM cells are transmitted between the input/output section 11 and the ACT side switch 12a and between the ACT side switch 12a and the ATM application processing section 13. In other word, the ATM switch section 12a is on the ACT side and the ATM switch 12b is on the SBY side literally as they are labeled. The circuit switching system operates for the switching processing based on the sequential numbers as described below.

(1) The control section 14 initially sets the ACT side ATM switch 12a to pass specified cells along the signal path including all the devices connected in the circuit.

(2) The control section 14 also initially sets the ATM application processing section 13 so that the ATM application processing section 13 returns the received specified cells to the ascending cell routes of the signal path in which the received cells have been transmitted through the descending cell route.

Figure 4:
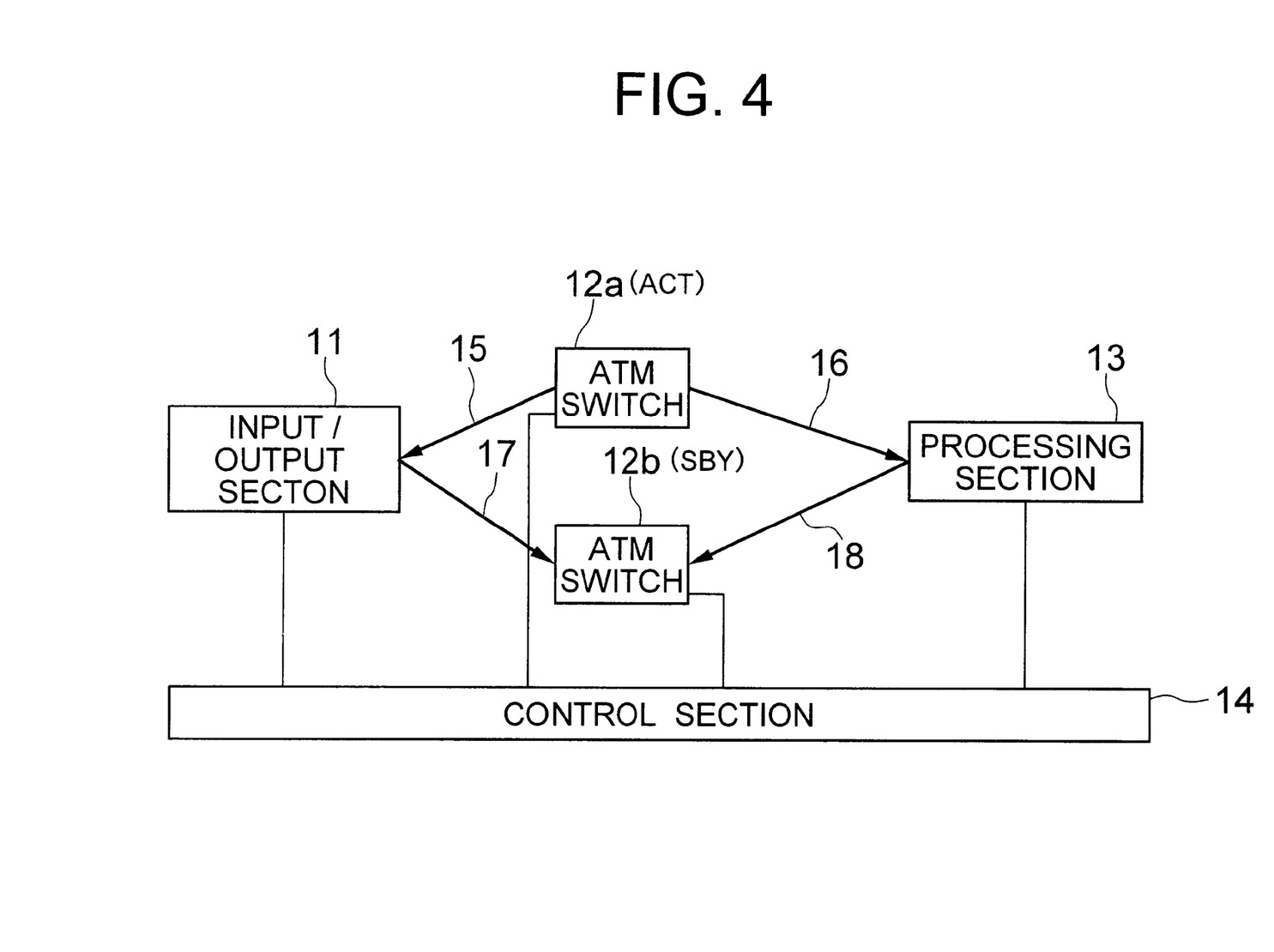
FIG. 4 is a block diagram of the circuit switching system, showing the flow of cells during a stage of the switching operation thereof.

(3) When the switching operation between the ATM switches is to be executed, the control section 14 switches the active ascending cell route from both the ascending signal lines 151 and 162 in FIG. 2 to the ascending signal lines 171 and 182 to the SBY side ATM switch 12b, in step S1 of FIG. 10. This stage is shown in FIG. 4. Thus, ATM cells output from both the input/output section 11 and the ATM application processing section 13 flow into the SBY side ATM switch 12b, with the ACT side switch 12a continuing to deliver own ATM cells in the descending direction.

Figure 5:
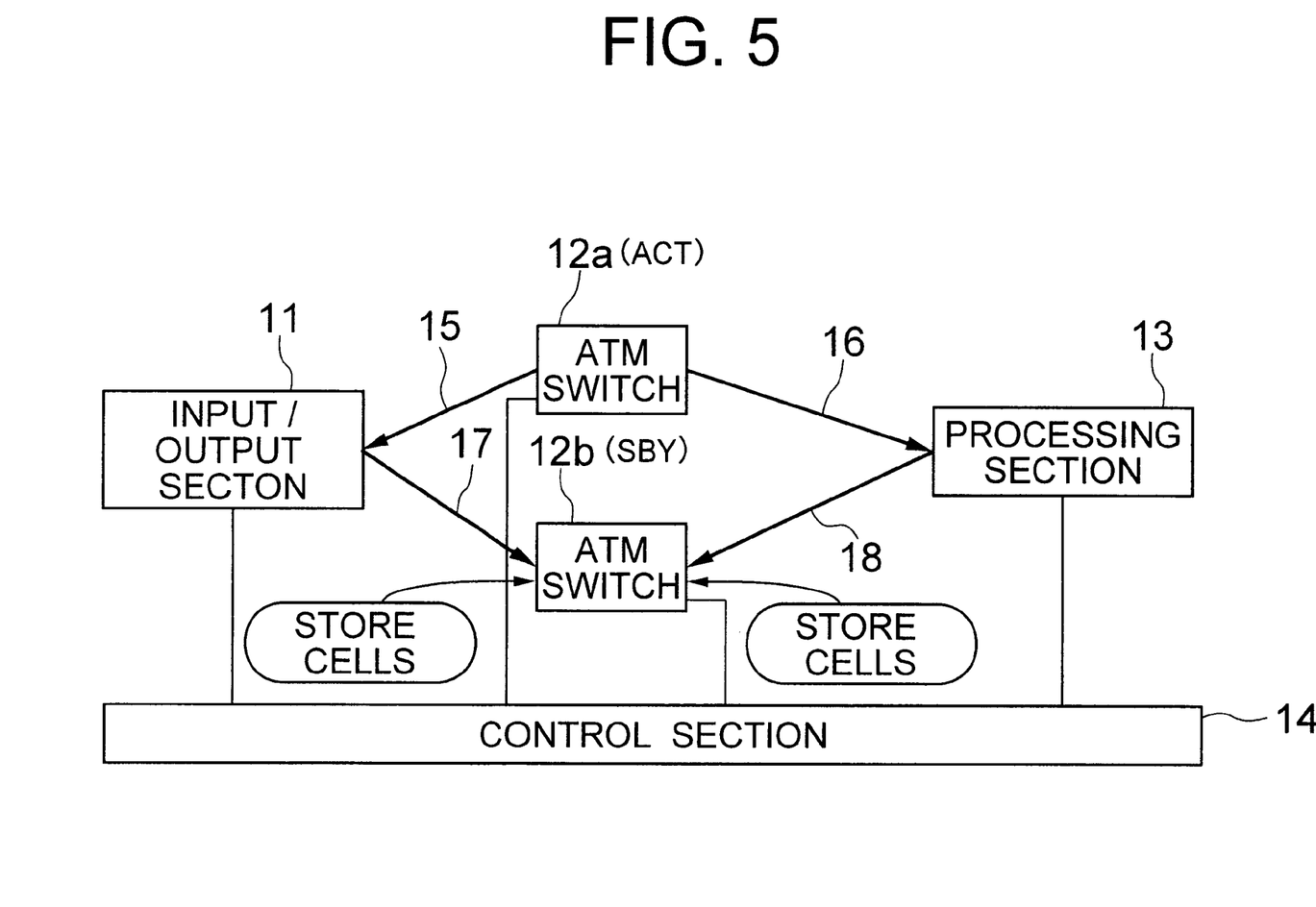
FIG. 5 is a block diagram of the circuit switching system, showing the flow of cells during a stage of the switching operation thereof.

(4) The control section 14 instructs the SBY side ATM switch 12b to temporarily store the received ATM cells in a built-in buffer (not shown) of the SBY side ATM switch 12b in step S2 of FIG. 10. This stage is shown in FIG. 5.

(5) The control section 14 then controls the input/output section 11 to transmit therethrough one or more of specified cell to the ATM application processing section 13 through each of the signal lines passing the ACT side ATM switch 12a in step S3 of FIG. 10. In this stage, although a single specified cell may be transmitted from the input/output section 11 through each of the signal lines, a plurality of prescribed cells are preferably sequentially transmitted. More specifically, the input/output section 11 transmits p×m specified cells, for example, through the ACT side ATM switch so that each of m signal lines passes p specified cells, and each of n signal lines passes p×m/n (integer) specified cells. The reason of transmitting a plurality of (p) specified cells through each of the m or n signal lines is that even if part of the plurality of specified cells is lost during the transmission, the remainder of the specified cells should be safely transmitted and then returned to the input/output section 11.

Figure 6:
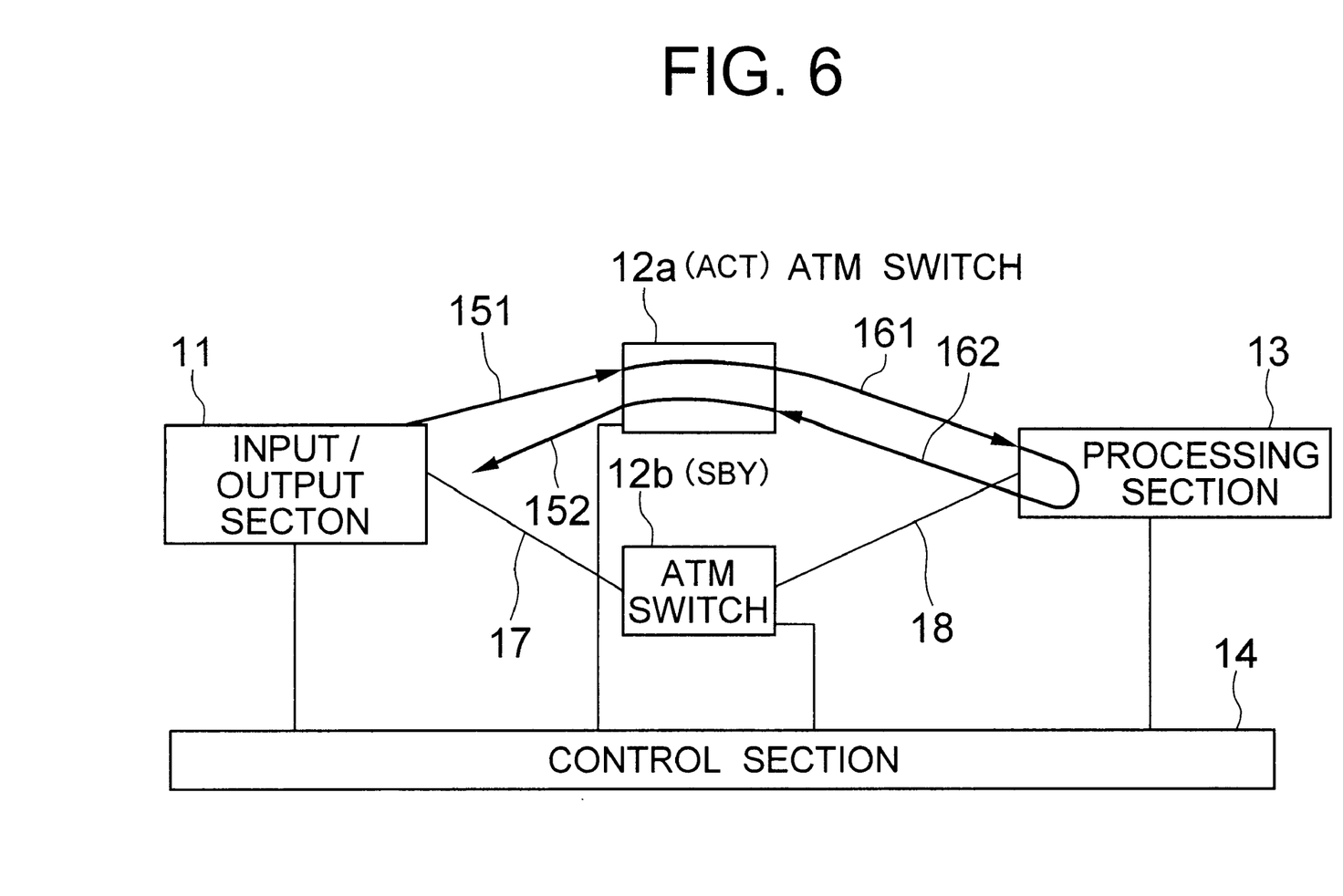
FIG. 6 is a block diagram of the circuit switching system, showing the flow of cells during a stage of the switching operation thereof.

(6) The ATM application processing section 13 returns the transmitted specified cells to the input/output section 11 through the ACT side ATM switch 12a as shown in FIG. 6.

(7) If the input/output section 11 detects reception of the first one of the specified cells (or heading cell) through each of the m descending signal lines from the ATM application processing section 13 in S4 of FIG. 10, the input/output section 11 notifies the control section 14 of the fact of reception of the heading cell. Thus, the control section 14 judges that there is no ATM cells staying in the descending cell routes of the ACT side ATM switch 12a. This is because during the period between the departure of the heading cell from the input/output section 11 and its return to the input/output section 11 through the ACT side ATM switch 12a, ATM application processing section 13 and the ACT side ATM switch 2a, all the ATM cells staying in the built-in buffer of the ACT side ATM switch 12a must be discharged. It is to be noted that if the reception of the heading cell is not detected in S4 of FIG. 10, the control section 14 waits for control until the reception of any cell is detected.

Figure 7:
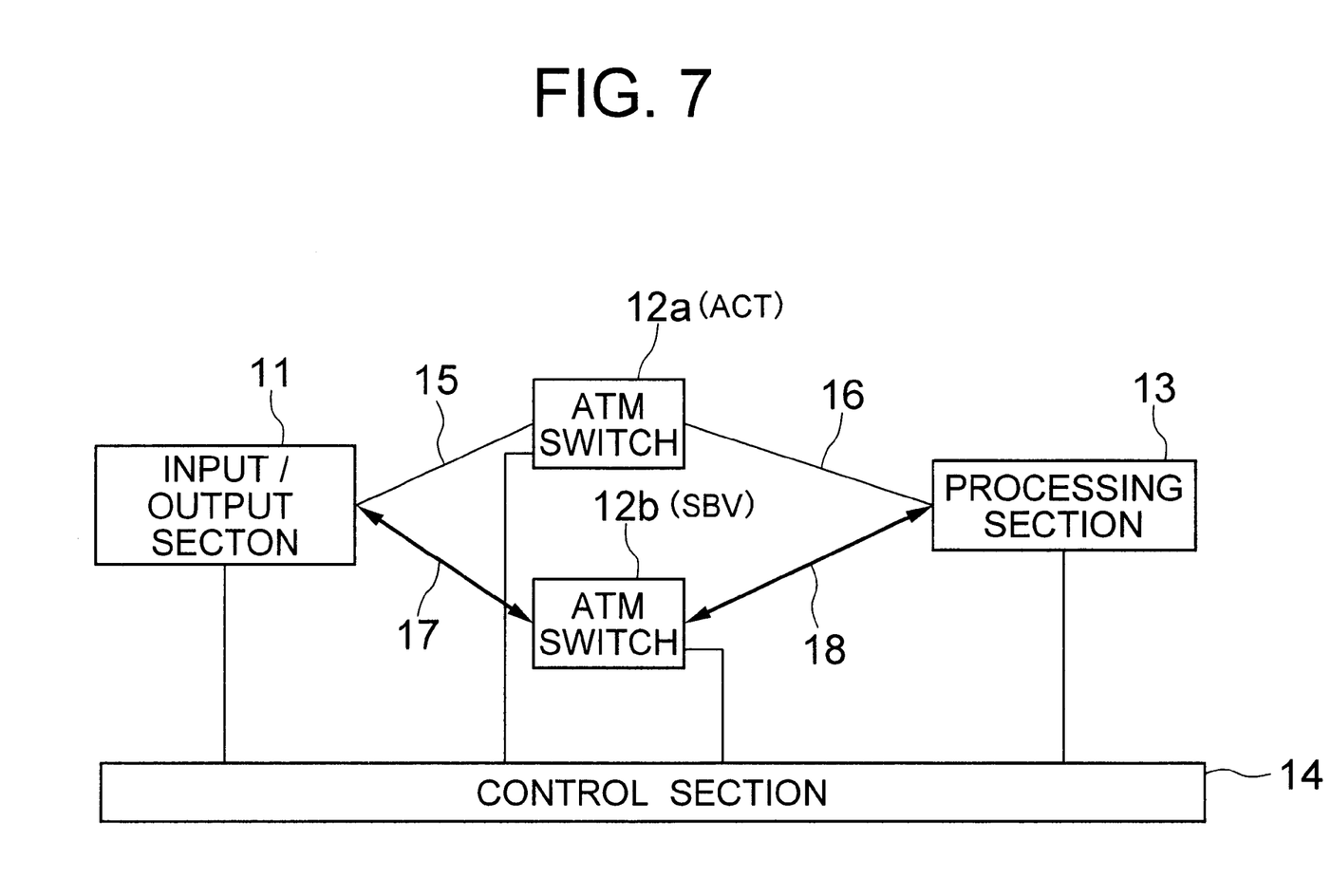
FIG. 7 is a block diagram of the circuit switching system, showing the flow of cells during a stage of the switching operation thereof.

(8) The control section 14 then switches both the descending cell routes between the ATM switch 12a and the input/output section 11 and between the ATM application processing section 13 and the ATM switch 12a to the descending cell routes between the SBY side ATM switch 12b and the input/output section and between the ATM application processing section 13 and the ATM switch 12b, in S5 of in FIG. 10. This stage is shown in FIG. 7.

(9) The control section 14 instructs the SBY side ATM switch 12b to start delivering own ATM cells that are temporarily stored in the built-in buffer of the SBY side ATM switch 12b, in step S6 of FIG. 9. This stage is shown in FIG. 8.

(10) The control section 14 changes the label of the ATM switch 12a to indicate the SBY side and the label of the ATM switch 12b to indicated the ACT side, thereby updating the internal management information in the control section 14 in step S7 of FIG. 10. This stage is shown in FIG. 9.

In the present embodiment, the ATM switches 12a and 12b have respective built-in buffers for temporarily storing ATM cells therein. In this regard, each of the input/output section 11 and the ATM application processing section 13 need not have a buffer for temporarily storing the ATM cells.

It is to be noted that signal lines used in the switchboard of the present embodiment may be metallic wires or optical fibers. The ATM application processing section may function for any signal processing such as voice/sound processing or ATM ceU processing. Since the above embodiments are described only for examples, the present invention is not limited to the above embodiments and various modifications or alterations can be easily made therefrom by those skilled in the art without departing from the scope of the present invention.

What is claimed is:

1. A switchboard system comprising:

an input/output section for receiving/transmitting cells, said input/output section having a plurality of m external input terminals connected to m external input lines, m external output terminals connected to m external output lines, m internal input terminals and m internal output terminals;

first and second switches each for acting as an active side switch or a standby side switch, each of said first and second switches having m first ascending terminals, a plurality of n first descending terminals, n second ascending terminals, and m second descending terminals, said m first ascending terminals being connected to said m internal output terminals through m first ascending lines, said m second descending terminals being connected to said m internal input terminals, said m first ascending terminals being coupled to n first descending terminals by switching, said n second ascending terminals being coupled to said m second descending terminals by switching;

a signal processing section for processing received cells, said signal processing section having n signal input terminals connected to said n first descending terminals of each of said first and second switches through n second descending lines, and n signal output terminals connected to said n second ascending terminals of each of said first and second switches through n second ascending lines; and a control section for controlling switching between said first switch and said second switch, said control section consecutively controlling said switching so that said control section switches active side ascending cell routes from said first and second ascending lines of a then active side switch to said first and second ascending lines of the then standby side switch, that said input/output section transmits a plurality of specified cells through at least said first ascending lines and said second descending lines of said active side switch to said signal processing section, and receives said specified cells through at least said second ascending lines and said first descending lines of said active side switch, and that said control section switches active side descending cell routes from said first and second descending lines of said then active side switch to said first and second descending lines of said then standby side switch, each of said given m and n being an integer.

2. The switchboard system as defined in claim 1, wherein said control section switches said active side descending cell routes after said input/output section receives a heading cell among said specified cells.

3. The switchboard system as defined in claim 1, wherein said second switch includes a buffer for temporarily storing cells during said switching.

4. The switchboard system as defined in claim 3, said second switch delivers said cells stored in said buffer through said first and second descending lines after said control section switches said active side descending cell routes.

5. The switchboard system as defined in claim 3, wherein said signal processing section acts for ATM processing.

6. A method for controlling switching in a switchboard system having an input/output section for receiving/transmitting cells, first and second switches each for acting as one of an active side switch and a standby side switch to transmit cells to/from said input/output section, a signal processing section for processing cells received from one of said first and second switches, said method comprising:

switching active side ascending cell routes from first and second ascending lines of an active one of said switches to first and second ascending lines of a standby one of said switches;

transmitting a plurality of predetermined cells through said active one of said switches to said signal processing section and receiving said predetermined cells through said active one of said switches, and switching active side descending cell routes from first and second descending lines of said active one of said switches to first and second descending lines of said standby one of said switches.

7. The method as defined in claim 6, wherein said switching of active side descending cell routes is effected after a heading one of said predetermined cells is received by said input/output section.

8. The method as defined in claim 6, wherein said standby one of said switches stores cells in a buffer after said switching of active side ascending cell routes.

9. The method as defined in claim 8, wherein said standby one of said switches delivers said cells stored in said buffer after said switching active side descending cell routes.

10. The method as defined in claim 6, further comprising updating control information to exchange labels between said active one of said switches and said standby one of said switches.

11. A method for activating a standby ATM switch in a switchboard system comprising an input/output section for receiving/transmitting ATM cells, a signal processing section for processing cells, and an active ATM switch and a standby ATM switch each coupled between the input/output section and the signal processing section, the method comprising:

commencing outputting of cells from the input/output section and the signal processing section to the standby ATM switch;

buffering cells received from said input/output section and said signal processing section in the standby ATM switch;

clearing the active ATM switch of previously received cells by sending predetermined cells from the input/output section through the active ATM switch to the signal processing section and receiving the predetermined cells in the input/output section from the signal processing section through the active ATM switch; and commencing outputting of buffered cells from the standby ATM switch to the input/output section and the signal processing section.

* * * * *